United States Patent Office 3,187,031
Patented June 1, 1965

3,187,031
PHENYL-SUBSTITUTED SILALKYLENE COMPOUNDS
Donald R. Weyenberg, Midland, Mich., assignor to Dow Corning Corporation, Midland, Mich., a corporation of Michigan
No Drawing. Filed July 3, 1961, Ser. No. 121,309
18 Claims. (Cl. 260—448.2)

This invention relates to copolymers prepared from halogenosilanes and/or halogenosiloxanes with phenyl-substitute ethene.

This application is a continuation-in-part of my co-pending application Serial Number 55,166, filed September 12, 1960, as a continuation-in-part of my then co-pending application Serial Number 29,185, filed May 16, 1960, both of the foregoing applications being now abandoned.

More specifically, this invention relates to a copolymeric compound consisting essentially of organosilicon units (1) selected from the group consisting of units of the formulae —SiR$_m$ and SiR$_m$[OSiR$_2$]$_n$— in which each R is a monovalent hydrocarbon radical free of aliphatic unsaturation or a functional substituent which can be either the hydrogen atom or an —OR' radical in which R' is a monovalent hydrocarbon radical free of aliphatic unsaturation, each $m$ is a positive integer from 2 to 3 inclusive and each $n$ is a positive integer, and units (2) of the formula —C(C$_6$H$_5$)$_a$(CH$_3$)$_b$H$_{2-a-b}$—C(CH$_3$)$_c$H$_{2-c}$— in which $a$ can be 1 or 2, $b$ and $c$ can each be 0 or 1 and $a+b+c$ is no greater than 2.

In the organosilicon units (1) R can be, for example, any alkyl radical such as the methyl, ethyl, isopropyl, tert-butyl, 2-ethylhexyl, dodecyl, octadecyl and myricyl radicals; any cycloalkyl radical such as the cyclopentyl and cyclohexyl radicals; any aryl radical such as the phenyl radical; any aralkyl radical such as the benzyl, phenylethyl and xylyl radicals; any alkaryl radical such as the tolyl and dimethylphenyl radicals; the hydrogen atom or an —OR' radical in which R' can be any monovalent hydrocarbon radical free of aliphatic unsaturation such as those shown above for R.

The organosilicon units (1) can have, for example, any of the following configurations: —SiR$_2$—, —SiR$_3$, —SiR$_2$(OSiR$_2$)$_n$— and SiR$_3$(OSiR$_2$)$_n$— where R and $n$ are as defined above. Since R can be R', H or —OR', these configurations represent such units as, for example, —SiR'H—, —SiR'(OR')—, —SiH(OR')—, —SiR'$_2$—,
—SiH$_2$—, —Si(OR')$_2$—, —SiR'$_3$, —SiR'$_2$H,
—SiR'$_2$(OR'), —SiR'H$_2$, —SiR'(OR')$_2$, —Si(OR')$_3$,
-SiR'(OR')[OSiR'$_2$]$_n$—, -SiR'(OR')[OSiR'(OR')]$_n$—,
HSiR'$_2$[OSiR'$_2$]$_n$—, (R'O)SiR'$_2$[OSiR'$_2$]$_n$—,
(R'O)$_2$SiR'[OSiR'$_2$]$_n$—,
(R'O)SiR'$_2$[OSiHR']$_n$— and the like. When any of the organosilicon units (1) contain hydrolyzable groups, these groups can be hydrolyzed to hydroxyl groups which can be condensed and cocondensed to form polymeric structures containing new siloxane linkages.

The phenyl-substituted ethylene units (2) can be —CHPh—CH$_2$—, —CMePh—CH$_2$—, —CPh$_2$—CH$_2$— and CHPh—CHMe— units in which Me and Ph represent the methyl and phenyl radicals respectively. These units can be present singly or in polymeric blocks.

When the copolymers are not endblocked with an —SiR$_3$ unit, they are enblocked primarily with units such as PhCH$_2$—CH$_2$,

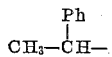
CH$_3$—CH—
PhMeCH—CH$_2$—, Ph$_2$CH—CH$_2$—, and

PhCH$_2$—CHMe— units. This type of endblocking is accomplished by using a molar excess of unit (2) and hydrolyzing the copolymer.

The copolymers of this invention are best prepared by reacting in a solvent solution in contact with an alkali metal such as sodium, potassium and the like, an organosilicon compound (1) which can be a halogenosilane of the formula R$_m$SiX$_{4-m}$ or a halogenosiloxane of the formula R$_m$X$_{3-m}$Si[OSiR$_2$]$_n$X in which each R, $m$ and $n$ are as defined above and each X is a halogen atom such as chlorine, bromine, iodine or fluorine, and a phenyl-substituted ethene compound (2) of the formula C(C$_6$H$_5$)$_a$(CH$_3$)$_b$H$_{2-a-b}$=C(CH$_3$)$_c$H$_{2-c}$ in which $a$, $b$ and $c$ are as defined above.

The halogenosilanes and halogenosiloxanes (1) employed herein include compounds having such configurations as, for example: R$_2$SiX$_2$, R$_3$SiX, XSiR$_2$(OSiR$_2$)$_n$X and R$_3$Si(OSiR$_2$)$_n$X where R, X and $n$ are as defined above. These materials can all be prepared by well-known methods.

The phenyl-substituted ethene compounds (2) employed herein include compounds such as, for example:

PhCH=CH$_2$, PhMeC=CH$_2$, Ph$_2$C=CH$_2$ and PhCH=CHMe, all of which are well known.

The solvent employed in this method can be any true organic solvent, i.e. a liquid unreactive to the system but capable of dissolving the organic and organosilicone components. The commonest solvents are the well-known hydrocarbon solvents such as, for example, xylene, benzenes, toluene, hexane and cyclopentane.

Another class of solvents which are operative in this method are ethers, both monoethers and polyethers, each free of alipathic unsaturation. For example, the ethers can be dimethyl ether, ethylmethyl ether, diethyl ether, di-n-proply ether, 1-methoxy-penatne, tetrahydrofuran, tetrahydropyran, 2-butoxymethyltetrahydrofuran, the dimethyl ether of ethylene glycol, the diethyl ether of ethylene glycol and bis-β-ethoxyethyl ether. Preferably, the ether is a cyclic ether or a linear ether in which there is at least one etheral oxygen atom to which is attached at least one group of no more than two carbon atoms, e.g. the methyl and ethyl groups. Also prefered are the linear polyethers having a carbon to oxygen ratio of less than 5:1, more preferably less than 3:1.

The alkali metals employed herein are well known. Since the reaction involved apparently takes place at the alkali metal surface, the alkali metal is usually added as a free metal or a suspension of free metal in some solvent soluble solid or liquid.

The method of preparation employed herein can be a one-step process or a multiple step process. The multiple step process is preferred for preparing block copolymers since such a process gives the greatest product control. More explicitly, block copolymers can best be prepared by polymerizing the phenyl-substituted ethene compound (2) to the desired polymer size in an ether solvent in contact with an alkali metal, adding a separately prepared chlorosilane or chlorosiloxane (1) of the desired molecular weight and configuration, adding compound (2) and allowing it to add on to the copolymer and to polymerize to the desired block, adding more chlorosiloxane and so forth until the desired block copolymers are built up. These methods are specifically illustrated in the specific examples below. These methods are most easily employed at room temperature and atmospheric pressure, but heating, cooling, pressure and vacuum can be employed to vary the reaction rate if desired.

The fluids of this invention are useful as hydraulic fluids. The solid compositions of this invention are useful as both film-forming and fiber-forming resins depending on the functionality of the starting materials.

The following examples are merely illustrative and are not intended to limit this invention which is properly delineated in the claims.

Example 1

23 grams (1 gram-atom) of sodium metal and 108 grams (1 mol) of trimethylchlorosilane were mixed with 150 ml. (approximately 133 grams) of tetrahydrofuran. To this stirred mixture 52 grams (0.5 mol) of styrene were added. Three products were obtained from this reaction mixture. One was $$(CH_3)_3SiCH(C_6H_5)-CH_2Si(CH_3)_3$$

a liquid having the following physical properties: boiling point 93° to 97° C. at 4 to 5 mm. Hg pressure; $n_D^{25}$ 1.4890 to 1.4895. The other two products were solid isomers having the general formula:

$$(CH_3)_3SiCH(C_6H_5)CH_2CH_2CH(C_6H_5)Si(CH_3)_3$$

One of the isomers had a melting point 106.5 to 108° C., while the other had a melting point of 50.5 to 52° C.

When the following silanes are substituted mol per mol for the trimethylchlorosilane above, the following products result:

| Silane | Product |
| --- | --- |
| $(C_6H_{11})(CH_3)_2SiBr$ | $(C_6H_{11})(CH_3)_2SiCH(C_6H_5)CH_2Si(CH_3)_2(C_6H_{11})$ |
| $(C_{12}H_{25})(CH_3)_2SiCl$ | $(C_{12}H_{25})(CH_3)_2SiCH(C_6H_5)CH_2Si(CH_3)_2(C_{12}H_{25})$ |
| $(C_6H_5CH_2)(CH_3)_2SiCl$ | $(C_6H_5CH_2)(CH_3)_2SiCH(C_6H_5)CH_2Si(CH_3)_2(CH_2C_6H_5)$ |
| $(C_2H_5)_3SiCl$ | $(C_2H_5)_3SiCH(C_6H_5)CH_2Si(C_2H_5)_3$ |
| $(CH_3)_3SiOSi(CH_3)_2Cl$ | $(CH_3)_3SiOSi(CH_3)_2CH(C_6H_5)CH_2Si(CH_3)_2OSi(CH_3)_3$ |

Example 2

118 grams (1 mol) of α-methylstyrene were added over a 30 minute period to a mixture of 11.5 grams (0.5 gram-atom) of sodium and 400 ml. (approximately 355 grams) of tetrahydrofuran. About 27 grams (0.25 mol) of trimethylchlorosilane were added dropwise with vigorous stirring. The solution remained a characteristic red color throughout this addition. The reaction mixture was filtered and stripped to 150° C. at 0.3 mm. Hg yielding a polymeric product consisting of a poly-α-methylstyrene of 7 to 8 units endblocked with trimethylsilyl units as verified by silicon analysis. This solid had a melting point of approximately 80° C., was soluble in toluene and was insoluble in methanol.

When the following chlorosilanes are substituted for the trimethylchlorosilane in this preparation, the following products result:

| Chlorosilane | Product |
| --- | --- |
| $(C_6H_5)(CH_3)_2SiCl$ | A polymeric product consisting of a poly-α-methylstryene of 7 to 8 units endblocked with phenyldimethylsilyl units. |
| $(CH_3)SiCl(OCH_3)_2$ | A polymeric product consisting of a poly-α-methylstyrene of 7 to 8 units endblocked with methyldimethoxysilyl units. |

Example 3

To a stirred mixture of 23 grams (1 gram-atom) of sodium metal and 250 ml. (approximately 222 grams) of tetrahydrofuran were added 59 grams (0.5 mol) of α-methylstyrene. To this mixture were added 108 grams (1.0 mol) of trimethylchlorosilane at a rate sufficient to maintain a colorless solution. After further stirring for two days the mixture was distilled to yield $$(CH_3)_3SiC(C_6H_5)(CH_3)CH_2Si(CH_3)_3$$

a liquid having the following physical properties: boiling point 107° to 109° C. at 4 mm. Hg; $n_D^{25}$ 1.5018.

When $C_6H_5CH=CHCH_3$ is substituted mol per mol for the α-methylstyrene above, $$(CH_3)_3SiCH(C_6H_5)CH(CH_3)Si(CH_3)_3$$

is produced.

Example 4

To a mixture of 129 grams (1 mol) of dimethyldichlorosilane, 46 grams (2 gram-atoms) of sodium metal and 250 ml. of tetrahydrofuran were added 208 grams (2 mols) of styrene over a 30 minute period with external cooling. The mixture was filtered. The solvent was stripped from the liquid portion of the mixture leaving a residue which had a silicon analysis corresponding to a polymer having the formula $$[-CH(C_6H_5)-CH_2-CH_2-CH(C_6H_5)-Si(CH_3)_2]_z$$

where $z$ is a positive integer. There was no evidence of SiOSi or SiSi linkages.

When $ClSi(CH_3)_2[OSi(CH_3)_2]_3Cl$ is substituted mol per mol for the dimethyldichlorosilane above, the resulting residue is primarily a copolymer having the approximate formula:

$$\{-CH(C_6H_5)CH_2CH_2-CH(C_6H_5)[Si(CH_3)_2O]_3Si(CH_3)_2-\}_z$$

Example 5

26 grams (0.25 mol) of styrene were added over a 30 minute period to a stirred mixture of 15 grams (0.65 gram-atom) of sodium, 54.3 grams (0.5 mol) of trimethylchlorosilane, 200 ml. of diethylether and approximately 20 grams of rock salt. After 24 hours the resulting precipitate was filtered off. Distillation of the filtrate yielded $(CH_3)_3SiCH(C_6H_5)CH_2Si(CH_3)_3$ and the mixture of solid isomers obtained in Example 1.

Example 6

54 grams (0.5 mol) of trimethylchlorosilane and 26 grams (0.25) of styrene were added simultaneously with stirring at 65° to 70° C. to a dispersion of 12.5 grams of sodium (as a 50 percent by weight emulsion in paraffin wax) in 110 ml. of benzene. The products isolated were the same as those in Example 1.

Example 7

When 11.8 grams (0.1 mol) of α-methylstyrene and 0.46 gram (0.02 gram-atom) of sodium metal are stirred together in 25 ml. of tetrahydrofuran until a red color appears and 1500 grams (0.01 mol) of $$ClSi(CH_3)_2[OSi(CH_3)_2]_{2026}Cl$$

(having a viscosity at 25° C. of approximately one million cs.) dispersed in 3000 ml. of tetrahydrofuran are added with vigorous stirring at a constant rate sufficiently slow to maintain the red color as long as possible, the residue remaining after filtering the mixture and stripping the solvent from the liquid portion is primarily a copolymer having the approximate formula:

$$\{[-C(C_6H_5)(CH_3)CH_2-]_{10}[-Si(CH_3)_2-]_{2026}Si(CH_3)_2-\}_z$$

where $z$ is a positive integer.

Example 8

46 grams (2 gram-atoms) of sodium metal were mixed with 300 ml. (approximately 266 grams) of tetrahydrofuran. To this stirred mixture was added a mixture of 208 grams (2 mols) of styrene and 129 grams (1 mol) of dimethyldichlorosilane over a period of one hour. The reaction was exothermic, and external cooling was required. The reaction mixture was filtered. The filtrate was washed with water and dried over anhydrous calcium chloride. Solvent was stripped from the filtrate leaving a residue which was distilled to yield:

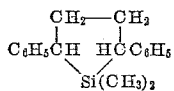

having the following properties: boiling point 143° to 145° C. at 1 mm. Hg; $n_D^{25}$ 1.5746.

*Example 9*

25 grams (0.14 mol) of 1,1-diphenylethene dissolved in 35.5 grams of tetrahydrofuran were added with stirring to a mixture of 6.44 grams (0.28 gram-atom) of finely divided sodium in 88.8 grams of tetrahydrofuran at a rate sufficient to maintain a system temperature of 30° C. 30.4 grams (0.28 mol) of trimethylchlorosilane dissolved in 44.4 grams of tetrahydrofuran were added slowly with stirring to the reaction mixture which was then stirred for 2 days. 2.97 grams (0.13 gram-atom) of sodium metal was recovered by filtration, and the filtrate was distilled producing a liquid product boiling at 220° to 230° C. at 0.2 to 0.3 mm. Hg. This product was recrystallized three times from ethanol producing a white crystalline solid having a melting point of 170° to 172° C. Elemental analysis and the infrared spectrum confirmed the product as $(CH_3)_3Si-C(C_6H_5)_2-CH_2-CH_2-C(C_6H_5)_2-Si(CH_3)_3$

*Example 10*

196 grams of styrene were added to a mixture of 506 grams of dimethylmethoxychlorosilane, 46 grams of sodium and 750 ml. of tetrahydrofuran with stirring and external cooling. An additional 46 grams of sodium were added, and the mixture was stirred at room temperature for two days. The mixture was then filtered and the filtrate distilled to produce:

(I) $CH_3OSi(CH_3)_2CH(C_6H_5)CH_2Si(CH_3)_2OCH_3$, B.P. 125° to 126° C. at 6 to 7 mm. Hg $n_D^{25.2}$ 1.4958.

(II) $CH_3OSi(CH_3)_2CH(C_6H_5)$
$CH_2CH_2CH(C_6H_5)Si(CH_3)_2OCH_3$

B.P. 144° to 148° C. at 0.3 mm. Hg.

When the following silanes are substituted mol per mol for the dimethylmethoxychlorosilane above, the following products result:

| Silane | Product |
| --- | --- |
| $(CH_3)_2SiCl(OC_4H_9)$ | $C_4H_9OSi(CH_3)_2CH(C_6H_5)CH_2Si(CH_3)_2OC_4H_9$ |
| $(CH_3)_2SiCl(OC_6H_5)$ | $C_6H_5OSi(CH_3)_2CH(C_6H_5)CH_2Si(CH_3)_2OC_6H_5$ |
| $(CH_3)_2SiCl(OC_6H_{11})$ | $C_6H_{11}OSi(CH_3)_2CH(C_6H_5)CH_2Si(CH_3)_2OC_6H_{11}$ |
| $(CH_3)_3SiOSi(OCH_3)(CH_3)OSi(CH_3)_2Cl$ | $(CH_3)_3SiOSi(OCH_3)(CH_3)OSi(CH_3)_2CH(C_6H_5)CH_2Si(CH_3)_2OSi(OCH_3)(CH_3)OSi(CH_3)_3$ |

The products endblocked with hydrolyzable groups such as the alkoxyl and phenoxyl groups above can be hydrolyzed and the resultant hydroxyl endblocked products condensed to form polymeric structures containing siloxane linkages.

*Example 11*

199 grams dimethylchlorosilane and 104 grams of styrene were added to a mixture of 46 grams of sodium and 50 grams of rock salt in 300 ml. of tetrahydrofuran with stirring and external cooling. The mixture was stirred at least 16 hours at room temperature and was filtered. The filtrate was distilled producing:

(I) $HSi(CH_3)_2CH(C_6H_5)CH_2SiH(CH_3)_2$, B.P. 88° to 90° C. at 4–5 mm. Hg $n_D^{26}$ 1.5000.

(II) A mixture of stereoisomers of $HSi(CH_3)_2CH(C_6H_5)CH_2CH_2CH(C_6H_5)SiH(CH_3)_2$,
B.P. 164° to 166° C. at 4 to 5 mm. Hg $n_D^{26}$ 1.5348 to 1.5402.

That which is claimed is:

1. A copolymeric compound free of Si-Si bonding consisting essentially of organosilicon units (1) selected from the group consisting of units of the formulae $-SiR_m$ and $SiR_m[OSiR_2]_n-$ in which each R is selected from the group consisting of monovalent hydrocarbon radicals free of aliphatic unsaturation and functional substituents selected from the group consisting of the hydrogen atom and $-OR'$ radicals in which R' is a monovalent hydrocarbon radical free of aliphatic unsaturation, each $m$ is a positive integer from 2 to 3 inclusive and each $n$ is a positive integer, and units (2) of the formula $-C(C_6H_5)_a(CH_3)_bH_{2-a-b}-C(CH_3)_cH_{2-c}-$ in which $a$ is a positive integer from 1 to 2, $b$ and $c$ each ranges in value from 0 to 1 and $a+b+c$ is no greater than 2.

2. A copolymeric compound free of Si-Si bonding consisting essentially of organosilicon units (1) of the formula $-SiR_m$ in which each R is selected from the group consisting of monovalent hydrocarbon radicals free of aliphatic unsaturation and functional substituents selected from the group consisting of the hydrogen atom and $-OR'$ radicals in which R' is a monovalent hydrocarbon radical free of aliphatic unsaturation and each $m$ is a positive integer from 2 to 3 and ethylene units (2) of the formula $-C(C_6H_5)_a(CH_3)_bH_{2-a-b}-C(CH_3)_cH_{2-c}-$ in which $a$ is a positive integer from 1 to 2, $b$ and $c$ each ranges in value from 0 to 1 and $a+b+c$ is no greater than 2.

3. A copolymeric compound composed of (1) units of the formula $-SiR_3$ in which each R is an alkyl radical and (2) units of the formula $-C(C_6H_5)_aH_{2-a}-CH_2-$ in which $a$ is a positive integer from 1 to 2.

4. A copolymeric compound composed of (1) units of the formula $-Si(CH_3)_3$ and (2) units of the formula $-C(C_6H_5)_aH_{2-a}-CH_2-$ in which $a$ is a positive integer from 1 to 2.

5. A copolymeric compound composed of (1) units of the formula $-Si(CH_3)_3$ and (2) units of the formula $-CH(C_6H_5)-CH_2-$.

6. A copolymeric compound composed of (1) units of the formula $-Si(CH_3)_3$ and (2) units of the formula $-C(C_6H_5)_2-CH_2-$.

7. A copolymeric compound composed of (1) units of the formula $-SiR_3$ in which at least one R is a functional substituent selected from the group consisting of the hydrogen atom and $-OR'$ radicals in which R' is a monovalent hydrocarbon radical free of aliphatic unsaturation, any remaining R being a monovalent hydrocarbon radical free of aliphatic unsaturation, and (2) units of the formula $-C(C_6H_5)_a(CH_3)_bH_{2-a-b}-C(CH_3)_cH_{2-c}-$ in which $a$ is a positive integer from 1 to 2, $b$ and $c$ each ranges in value from 0 to 1 and $a+b+c$ is no greater than 2.

8. A copolymeric compound free of Si-Si bonding consisting essentially of (1) units of the formula $-SiR_3-$ in which each R is an alkyl radical and (2) units of the formula $-CH(C_6H_5)-CH_2-$.

9. A copolymeric compound free of Si-Si bonding consisting essentially of (1) units of the formula $-Si(CH_3)_2-$ and (2) units of the formula $-CH(C_6H_5)-CH_2-$.

10. A polymer free of Si-Si bonding consisting essentially of units of the formula $[-CH(C_6H_5)CH_2CH_2CH(C_6H_5)Si(CH_3)_2-]$ 11. A copolymeric compound free of Si-Si bonding composed of (1) units of the formula $-Si(CH_3)_m$ in which each $m$ is a positive integer from 2 to 3 and (2) units of the formula $-C(CH_3)(C_6H_5)-CH_2-$.

12. A copolymeric compound composed of (1) units of the formula $-Si(CH_3)_3$ and (2) units of the formula $-C(CH_3)(C_6H_5)-CH_2-$.

13. A copolymeric compound free of Si-Si bonding consisting essentially of (1) units of the formula $$SiR_m[OSiR_2]_n—$$

in which each R is selected from the group consisting of monovalent hydrocarbon radicals free of aliphatic unsaturation and functional substituents selected from the group consisting of the hydrogen atom and —OR' radicals in which R' is a monovalent hydrocarbon radical free of aliphatic unsaturation and each $m$ is a positive integer from 2 to 3, each $n$ is a positive integer and (2) units of the formula $$—S(C_6H_5)_a(CH_3)_bH_{2-a-b}—C(CH_3)_cH_{2-c}—$$

in which $a$ is a positive integer from 1 to 2, $b$ and $c$ each ranges in value from 0 to 1 and $a+b+c$ is no greater than 2.

14. A copolymeric compound free of Si-Si bonding consisting essentially of (1) units of the formula $$—SiR_2(OSiR_2)_n—$$

in which each R is an alkyl hydrocarbon radical and each $n$ is a positive integer and (2) units of the formula $$—CH(C_6H_5)—CH_2—$$

15. A copolymeric compound free of Si-Si bonding consisting essentially of (1) units of the formula $$—Si(CH_3)_2[OSi(CH_3)_2]_n—$$

in which each $n$ is a positive integer and (2) units of the formula —CH($C_6H_5$)—CH$_2$—.

16. $(CH_3)_3Si[C(CH_3)(C_6H_5)CH_2]_aSi(CH_3)_3$ in which $a$ is a positive integer.

17.

$$\begin{array}{c} CH_2—CH_2 \\ | \quad\quad | \\ C_6H_5CH \quad HCC_6H_5 \\ \diagdown \diagup \\ Si(CH_3)_2 \end{array}$$

18. A polymer consisting essentially of units of the formula

—CH($C_6H_5$)CH$_2$CH$_2$—CH($C_6H_5$)
[Si(CH$_3$)$_2$O]$_n$Si(CH$_3$)$_2$— in which $n$ is a positive integer.

References Cited by the Examiner

UNITED STATES PATENTS 2,160,915 6/39 Schreiber _____ 260—448.2

OTHER REFERENCES

Flory: Principles of Polymer Chemistry (Ithaca, N.Y.: Cornell Univ. Press, 1953), pp. 29–37.

Kadonaga et al.: Chemical Abstracts, vol. 49, page 14377 (1955).

Ryan et al.: Journal Organic Chemistry, vol. 24, pages 2052–3 (1959).

Speier et al.: Journal American Chemical Society, vol. 78, pages 2278–81 (1956).

Speier et al.: Journal American Chemical Society, vol. 79, pages 974–9 (1957).

MURRAY TILLMAN, *Primary Examiner.*

H. N. BURSTEIN, MILTON STERMAN, WILLIAM H. SHORT, *Examiners.*